US012811693B2

(12) United States Patent
Shimizu et al.

(10) Patent No.: US 12,811,693 B2
(45) Date of Patent: Nov. 24, 2026

(54) OPTICAL TRANSMISSION SYSTEM, PHASE CONJUGATE CONVERTER AND PHASE SENSITIVE AMPLIFIER

(71) Applicant: NTT, Inc., Tokyo (JP)

(72) Inventors: Shimpei Shimizu, Musashino (JP); Takushi Kazama, Musashino (JP); Takeshi Umeki, Musashino (JP); Takayuki Kobayashi, Musashino (JP); Yutaka Miyamoto, Musashino (JP)

(73) Assignee: NTT, Inc., Tokyo (JP)

( * ) Notice: Subject to any disclaimer, the term of this patent is extended or adjusted under 35 U.S.C. 154(b) by 168 days.

(21) Appl. No.: 18/868,035

(22) PCT Filed: Jun. 2, 2022

(86) PCT No.: PCT/JP2022/022502

§ 371 (c)(1),
(2) Date: Nov. 21, 2024

(87) PCT Pub. No.: WO2023/233626

PCT Pub. Date: Dec. 7, 2023

(65) Prior Publication Data

US 2026/0189305 A1 Jul. 2, 2026

(51) Int. Cl.
*H04B 10/532* (2013.01)

(52) U.S. Cl.
CPC .................................. *H04B 10/532* (2013.01)

(58) Field of Classification Search
None
See application file for complete search history.

(56) References Cited

U.S. PATENT DOCUMENTS

2021/0044358 A1* 2/2021 Kazama .................. G02F 1/377

FOREIGN PATENT DOCUMENTS

JP 2016218173 A 12/2016
JP 2018205595 A 12/2018

OTHER PUBLICATIONS

Z. Tong et al., Towards ultrasensitive optical links enabled by low-noise phase-sensitive amplifiers, Nature Photonics, vol. 5, Jul. 2011, pp. 430-436.

(Continued)

*Primary Examiner* — David W Lambert
(74) *Attorney, Agent, or Firm* — Harness, Dickey & Pierce, P.L.C.

(57) ABSTRACT

Provided is an optical transmission system including: a phase conjugate conversion device that performs optical parametric amplification, monitors power of a first polarization component and a second polarization component of first pilot light, synchronizes phases of harmonics and the first pilot light by controlling a phase of pump light to cause each optical power of the first pilot light to be maximum, and matches optical lengths of paths of a first optical parametric amplification unit and a second optical parametric amplification unit by controlling a transfer device arranged in at least one of the paths to cause an interference waveform of components of second pilot light to be maximum when the second pilot light is caused to pass in a second direction, the second pilot light having at least a wavelength or optical power different from that of the first pilot light; and a phase-sensitive amplification device that performs phase-sensitive amplification of an optical signal included in an optical transmission signal and idler light by optical parametric amplification using the pump light controlled by using the first pilot light included in the optical transmission signal.

6 Claims, 5 Drawing Sheets

(56) References Cited

OTHER PUBLICATIONS

Wataru Imajuku et al., Gain Characteristics of Coherent Optical Amplifiers Using a Mach-Zehnder Interferometer with Kerr Media, IEEE Journal of Quantum Electronics, vol. 35, No. 11, Nov. 1999, pp. 1657-1665.

* cited by examiner

OPTICAL TRANSMISSION SYSTEM, PHASE CONJUGATE CONVERTER AND PHASE SENSITIVE AMPLIFIER

CROSS-REFERENCE TO RELATED APPLICATIONS

This application is a 371 U.S. National Phase of International Application No. PCT/JP2022/022502, filed on Jun. 2, 2022. The entire disclosure of the above application is incorporated herein by reference.

TECHNICAL FIELD

The present invention relates to an optical transmission system, a phase conjugate conversion device, and a phase-sensitive amplification device.

BACKGROUND ART

With the recent start of operation of the fifth generation mobile communication system, the spread of rich content such as high-resolution moving images, and the like, communication traffic is increasing exponentially, and continuous increase in capacity of an optical fiber network is required. In optical fiber communication, in order to improve signal relay and reception sensitivity, an optical amplifier that amplifies an optical signal attenuated by fiber transmission as light is used.

A conventional optical amplifier represented by an erbium-doped fiber amplifier (EDFA) using an optical fiber to which erbium is added as an amplification medium is classified into a phase-insensitive amplifier (PIA). In the phase-insensitive amplifier, it is known that noise derived from amplified spontaneous emission (ASE) is mixed, thereby causing excessive signal-to-noise ratio degradation greater than or equivalent to a noise figure of 3 dB.

ASE noise is one of essential factors that degrades an optical signal-to-noise ratio (OSNR) among various noise factors in optical fiber transmission and limits a transmission capacity and a transmission distance. In order to ensure a high OSNR, it is necessary to make transmission power of an optical signal relatively strong against noise. However, when the energy density in the optical fiber increases accordingly, waveform distortion due to a nonlinear optical effect in the optical fiber becomes apparent, and conversely, signal quality degrades. For that reason, in order to further increase the distance and the capacity of optical fiber transmission, it is important to reduce the ASE noise and compensate for nonlinear distortion of the optical amplifier.

As a means for overcoming the theoretical noise limit of the conventional phase-insensitive amplifier, a phase-sensitive amplifier (PSA) using optical parametric amplification (OPA) has been studied. Optical parametric amplification is one of nonlinear optical processes for amplifying an optical signal by inputting an optical signal having an appropriate wavelength relationship and high-power pump light into a medium having high optical nonlinear characteristics.

As a nonlinear medium, there are a medium using second-order nonlinearity and a medium using third-order nonlinearity, and lithium niobate and a dispersion shifted optical fiber are representatives thereof, respectively. Along with signal amplification by optical parametric amplification, idler light is generated that is phase conjugate light of an optical signal. By using the idler light, optical parametric amplification can perform various types of optical signal processing, and phase-sensitive amplification is one of them.

In the phase-sensitive amplifier, the generated phase conjugate light and the original input optical signal are superimposed in the same band, whereby one of orthogonal phase components of the ASE is suppressed. As a result, ultra-low noise amplification less than or equal to the theoretical noise limit of the conventional phase-insensitive amplifier is implemented. In addition, there is also an effect of compensating for distortion in the phase direction due to a nonlinear optical effect or the like.

As one of configurations of the phase-sensitive amplifier, there is a degenerate PSA in which an optical signal to be amplified is arranged at a degenerate frequency that is the center of an amplification band of optical parametric amplification. In the degenerate PSA, the idler light is generated at the same degenerate frequency as the optical signal by interaction between the optical signal and the pump light in the nonlinear medium, and a phase-sensitive amplification effect is obtained by superposition thereof. The generated idler light has a phase derived from a relative phase difference between the optical signal and the pump light, and when the optical signal and the idler light are orthogonal to each other, one phase component is suppressed and low noise amplification is implemented. For that reason, a phase-locking loop (PLL) is required for appropriately controlling phases of the optical signal and the pump light.

However, in the degenerate PSA, it is necessary to perform amplification in parallel by a plurality of devices in a case where a wavelength division multiplexing signal (Wavelength Division Multiplexing (WDM) signal) is amplified, and it is not possible to amplify a signal having a signal distribution on both the real axis and the imaginary axis on a complex plane such as a quadrature amplitude modulation (QAM) signal, which become problems. Thus, for phase-sensitive amplification of a WDM signal or a QAM signal, research and development have been performed of a non-degenerate PSA (ND-PSA) in which a signal is arranged at a frequency shifted from a degenerate frequency of a phase-sensitive amplifier (see, for example, Non Patent Literature 1).

In the non-degenerate PSA, an optical signal and idler light are generated in advance on the transmission side at frequencies symmetric with respect to the degenerate frequency, and are co-propagated in a transmission line. In an optical parametric amplification process in a nonlinear medium, a phase-sensitive amplification operation is obtained by interaction among three light waves having different frequencies of the optical signal, idler light, and pump light. In a case where the three light waves are in an appropriate frequency arrangement, phase conjugate conversion light of the idler light is generated at the same frequency as the optical signal in the optical parametric amplification process. The phase conjugate conversion light of the optical signal is generated at the frequency of the idler light.

At this time, in a case where the optical signal and the converted idler light are superimposed in the same phase, a gain difference is generated between the optical signal and the ASE noise component due to constructive interference, whereby low noise amplification is implemented. In order for the optical signal and the idler light to be superimposed in the same phase, the pump light needs to be synchronized to an average frequency and an average phase (carrier component) between the optical signal and the idler light. By generating and transmitting the idler light by an amount of the wavelength-multiplexed optical signal, the non-degenerate PSA can perform collective phase-sensitive amplification of the WDM signal.

Focusing only on the band of the optical signal, the phase conjugate conversion light of the input idler light, that is, the light having the same complex amplitude distribution as that of the original optical signal is superimposed in the same phase, so that information in the phase direction is held even after the amplification, and a modulation signal of any format can be amplified. Generally, the idler light generated in advance on the transmission side is optically generated by modulating an optical signal as in normal optical transmission and then performing optical parametric amplification using only the optical signal as an input. A device that generates idler light that is phase conjugate light of an optical signal by using such optical parametric amplification is referred to as an optical phase conjugator (OPC).

CITATION LIST

Non Patent Literature

Non Patent Literature 1: Z. Tong, C. Lundstrom, P. A. Andrekson, C. J. McKinstrie, D. J. Blessing, E. Tipsuwannakul, B. J. Puttnam, H. Toda, and L. Gruner-Nielsen, "Towards ultrasensitive optical links enabled by low-noise phase-sensitive amplifiers", Nat. Photonics, vol. 5, no. 7, pp. 430-436, July 2011.

PATENT LITERATURE

Patent Literature 1: JP 2016-218173 A
Patent Literature 2: JP 2018-205595 A

SUMMARY OF INVENTION

Technical Problem

Optical parametric amplification, which is a nonlinear optical effect, generally has polarization dependency. Thus, in a case of amplifying a signal subjected to polarization-division multiplexing (PDM), a polarization diversity configuration is used that independently handles orthogonal polarization components (see, for example, Patent Literature 1). The same applies to not only the phase-sensitive amplifier but also the optical phase conjugator that generates idler light.

In the polarization diversity configuration, input light is divided into two orthogonal polarization components by using a polarization beam splitter, and each component is amplified by optical parametric amplification and then multiplexed again by a polarization beam combiner. Here, in order to perform phase-sensitive amplification, it is necessary to appropriately synchronize relative phases among the optical signal, the idler light, and the pump light in each polarization component so that the optical signal and the converted idler light form constructive interference. Since polarization rotation randomly occurs in the optical fiber as the transmission line, a polarization state input to the phase-sensitive amplifier is random. In each component (an X polarization component and a Y polarization component) divided by the polarization beam splitter in the phase-sensitive amplifier, the X polarization component and the Y polarization component in the optical phase conjugator do not necessarily match each other and are mixed. In each of the X polarization component and the Y polarization component in the optical phase conjugator using a conventional polarization diversity OPA, idler light is generated by different pump light. There is uncorrelated phase rotation between these pieces of pump light due to phase drift in the optical fiber or the like, and a signal-idler pair after polarization combining has an uncorrelated carrier component between orthogonal polarized waves.

In a case where there is a signal-idler pair having a plurality of carrier components among the X polarization and Y polarization components divided by the phase-sensitive amplifier, the frequency and the phase with which the pump light is to be synchronized are not uniquely determined, and it is impossible to perform optimum phase-sensitive amplification on all the input optical electric field components in any input polarization state. Thus, in order to achieve polarization independent operation of the phase-sensitive amplifier, a signal-idler pair to be amplified needs to have the same carrier component in any polarization component. However, due to influence of the above phase drift, this is difficult to achieve with a general polarization diversity configuration.

In order to solve this problem, a configuration has been proposed of an optical transmitter for generating a signal-idler pair having a carrier component independent of polarization by using a plurality of phase synchronization circuits (see, for example, Patent Literature 2). In the configuration described in Patent Literature 2, continuous light obtained by dividing a pump light source is used as pilot light, and is multiplexed with continuous light before an optical signal is modulated. The pilot light is optically modulated similarly to the optical signal and then passes through a nonlinear medium for generating idler light. At this time, the idler light is generated by optical parametric amplification, but the pilot light arranged at a degenerate wavelength overlaps with idler light of the pilot light and is subjected to degenerate phase-sensitive amplification.

The condition that the degenerate phase-sensitive amplification of the pilot light has the maximum amplification gain is when the phase of the pump light matches the phase of the pilot light. Thus, the phase of the pump light is synchronized by the phase synchronization circuit so that the power of the amplified pilot light is maximized, whereby the relative phase between the pump light and the optical signal can be fixed. Thus, the phase of the idler light generated by the interaction between the pump light and the optical signal is also fixed. Each of the orthogonal polarization components is subjected to the above-described processing and multiplexed by the polarization beam combiner to obtain a signal-idler pair subjected to polarization-division multiplexing. At this time, since the polarization components pass through different paths, there is a random phase difference between orthogonal polarized waves due to phase drift.

In order to set the phase difference to 0, the pilot light subjected to the degenerate phase-sensitive amplification is separated, a 45 degree linear polarization component is extracted, and power is monitored to obtain an interference pattern between components having passed through respective paths. By controlling a phase synchronization circuit different from that described above so that this interference pattern is always maximized, the optical lengths of the paths in the polarization diversity OPA are synchronized, and multiplexing is implemented in a state where the phases are aligned. Through the above processing, a polarization-division multiplexed signal-idler pair is generated having a carrier component independent of polarization.

On the other hand, in this configuration, since three PLLs are operated with one pilot light, there is a problem that operations of the PLLs interfere with each other. For example, the PLL that performs phase synchronization between polarized waves operates on the assumption that the PLL of a degenerate phase-sensitive amplification unit is operating, and thus is directly affected by the fluctuation of the PLL of the degenerate phase-sensitive amplification unit, and may be in a situation in which it is difficult to return to the normal operation again when the control once fails. Since the pilot light having the same wavelength is used, there has also been a case where a component of multiple reflection of the pilot light in the system flows into a monitor unit of each PLL, and the operation is made unstable.

In view of the above circumstances, an object of the present invention is to provide a technique capable of implementing stable polarization independence in an optical transmission system using phase-sensitive amplification.

Solution to Problem

An aspect of the present invention is an optical transmission system including: a phase conjugate conversion device including: a first split unit that splits pump light; a multiplexing unit that multiplexes first pilot light that is generated on the basis of the pump light split by the first split unit and propagates in a first direction, and an optical signal transmitted from an optical transmitter; a second split unit that splits the pump light split by the first split unit; a plurality of transfer units that respectively performs phase control on a plurality of pieces of the pump light split; a plurality of harmonic generation units that converts the plurality of pieces of the pump light subjected to phase control by the respective plurality of transfer units into harmonics; a division unit that divides the first pilot light and the optical signal that are multiplexed by the multiplexing unit into two polarization components orthogonal to each other; a first optical parametric amplification unit that performs optical parametric amplification on the basis of a first polarization component of the first pilot light and a first polarization component of the optical signal that are divided by the division unit, and the harmonics converted by the plurality of harmonic generation units; a second optical parametric amplification unit that performs optical parametric amplification on the basis of a second polarization component of the first pilot light and a second polarization component of the optical signal that are divided by the division unit, and the harmonics converted by the plurality of harmonic generation units; a combining unit that generates an optical transmission signal by multiplexing the first polarization component of the first pilot light and the first polarization component of the optical signal that are amplified by the first optical parametric amplification unit, and the second polarization component of the first pilot light and the second polarization component of the optical signal that are amplified by the second optical parametric amplification unit; a first monitor unit that monitors power of the first polarization component of the first pilot light amplified by the first optical parametric amplification unit; a second monitor unit that monitors power of the second polarization component of the first pilot light amplified by the second optical parametric amplification unit; a first control unit that synchronizes phases of the harmonics and the first pilot light by controlling phases of the pump light input to the plurality of harmonic generation units to cause each of optical power of the first pilot light amplified by the first optical parametric amplification unit and optical power of the first pilot light amplified by the second optical parametric amplification unit to be maximum on the basis of monitoring results by the first monitor unit and the second monitor unit; a second pilot light source that outputs second pilot light in which at least a wavelength or optical power is different from that of the first pilot light; a circulator that propagates the second pilot light output from the second pilot light source in a second direction that is an opposite direction to the first direction, and externally outputs the optical transmission signal output from the combining unit; and a second control unit that matches optical lengths of paths of the first optical parametric amplification unit and the second optical parametric amplification unit by controlling a transfer device arranged in at least one of the paths to cause an interference waveform of components of the second pilot light caused to pass in the second direction to be maximum; an optical transmission unit that transmits the optical transmission signal output from the phase conjugate conversion device; and a phase-sensitive amplification device that performs phase-sensitive amplification of the optical signal and idler light included in the optical transmission signal by optical parametric amplification using the pump light controlled by using the first pilot light included in the optical transmission signal.

An aspect of the present invention is a phase conjugate conversion device including: a first split unit that splits pump light; a multiplexing unit that multiplexes first pilot light that is generated on the basis of the pump light split by the first split unit and propagates in a first direction, and an optical signal transmitted from an optical transmitter; a second split unit that splits the pump light split by the first split unit; a plurality of transfer units that respectively performs phase control on a plurality of pieces of the pump light split; a plurality of harmonic generation units that converts the plurality of pieces of the pump light subjected to phase control by the respective plurality of transfer units into harmonics; a division unit that divides the first pilot light and the optical signal that are multiplexed by the multiplexing unit into two polarization components orthogonal to each other; a first optical parametric amplification unit that performs optical parametric amplification on the basis of a first polarization component of the first pilot light and a first polarization component of the optical signal that are divided by the division unit, and the harmonics converted by the plurality of harmonic generation units; a second optical parametric amplification unit that performs optical parametric amplification on the basis of a second polarization component of the first pilot light and a second polarization component of the optical signal that are divided by the division unit, and the harmonics converted by the plurality of harmonic generation units; a combining unit that generates an optical transmission signal by multiplexing the first polarization component of the first pilot light and the first polarization component of the optical signal that are amplified by the first optical parametric amplification unit, and the second polarization component of the first pilot light and the second polarization component of the optical signal that are amplified by the second optical parametric amplification unit; a first monitor unit that monitors power of the first polarization component of the first pilot light amplified by the first optical parametric amplification unit; a second monitor unit that monitors power of the second polarization component of the first pilot light amplified by the second optical parametric amplification unit; a first control unit that synchronizes phases of the harmonics and the first pilot light by controlling phases of the pump light input to the plurality of harmonic generation units to cause each of optical power of the first pilot light amplified by the first optical parametric amplification unit and optical power of the first pilot light amplified by the second optical parametric amplification unit to be maximum on the basis of monitoring results by the first monitor unit and the second monitor unit; a second pilot light source that outputs second pilot light in which at least a wavelength or optical power is different from that of the first pilot light; a circulator that propagates the second pilot light output from the second pilot light source in a second direction that is an opposite direction to the first direction, and externally outputs the optical transmission signal output from the combining unit; and a second control unit that matches optical lengths of paths of the first optical parametric amplification unit and the second optical parametric amplification unit by controlling a transfer device arranged in at least one of the paths to cause an interference waveform of components of the second pilot light caused to pass in the second direction through each of the first optical parametric amplification unit and the second optical parametric amplification unit to be maximum.

An aspect of the present invention is a phase-sensitive amplification device including: a pump light source that outputs pump light for optical parametric amplification by performing optical injection locking to the pump light source by using first pilot light included in an optical transmission signal transmitted from a phase conjugate conversion device that performs optical parametric amplification; a third split unit that splits the pump light output from the pump light source; a plurality of transfer units that respectively performs phase control on a plurality of pieces of the pump light split; a plurality of harmonic generation units that converts the plurality of pieces of the pump light subjected to phase control by the respective plurality of transfer units into harmonics; a division unit that divides an optical signal included in the optical transmission signal into two polarization components orthogonal to each other; a third optical parametric amplification unit that performs optical parametric amplification on the basis of a first polarization component of the optical signal divided by the division unit and the harmonics converted by the plurality of harmonic generation units; a fourth optical parametric amplification unit that performs optical parametric amplification on the basis of a second polarization component of the optical signal divided by the division unit and the harmonics converted by the plurality of harmonic generation units; a combining unit that multiplexes the first polarization component of the optical signal amplified by the third optical parametric amplification unit and the second polarization component of the optical signal amplified by the fourth optical parametric amplification unit; a third monitor unit that monitors power of the first polarization component of the optical signal amplified by the third optical parametric amplification unit; a fourth monitor unit that monitors power of the second polarization component of the optical signal amplified by the fourth optical parametric amplification unit; a third control unit that synchronizes phases of the harmonics and the optical signal by controlling phases of the pump light input to the plurality of harmonic generation units to cause each of optical power of the optical signal amplified by the third optical parametric amplification unit and optical power of the optical signal amplified by the fourth optical parametric amplification unit to be maximum on the basis of monitoring results by the third monitor unit and the fourth monitor unit; a third pilot light source that outputs third pilot light in which at least a wavelength or optical power is different from that of the first pilot light; a circulator that propagates the third pilot light output from the third pilot light source in a second direction that is an opposite direction to the first direction; and a fourth control unit that matches optical lengths of paths of the third optical parametric amplification unit and the fourth optical parametric amplification unit by controlling a transfer device arranged in at least one of the paths to cause an interference waveform of components of the third pilot light caused to pass in the second direction through each of the third optical parametric amplification unit and the fourth optical parametric amplification unit to be maximum.

Advantageous Effects of Invention

According to the present invention, it is possible to implement stable polarization independence in an optical transmission system using phase-sensitive amplification.

DESCRIPTION OF EMBODIMENTS

Hereinafter, an embodiment of the present invention will be described with reference to the drawings.

First Embodiment

Figure 1:
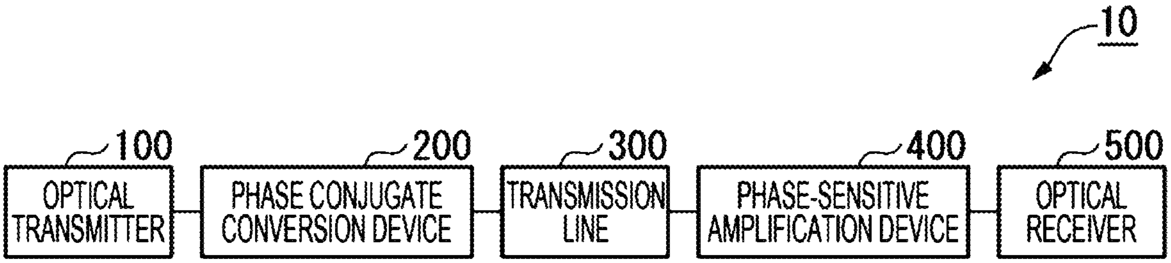
FIG. 1 A diagram illustrating a configuration example of an optical transmission system in a first embodiment.

FIG. 1 is a diagram illustrating a configuration example of an optical transmission system 10 in a first embodiment. The optical transmission system 10 includes an optical transmitter 100, a phase conjugate conversion device 200, a transmission line (optical transmitter) 300, a phase-sensitive amplification device 400, and an optical receiver 500. In the optical transmission system 10, repeaterless transmission using phase-sensitive amplification as a preamplifier is assumed. Here, the repeaterless transmission is a transmission method that does not use an optical repeater.

The optical transmitter 100 transmits an optical signal. Note that the optical signal transmitted by the optical transmitter 100 may be a polarization-division multiplexed signal.

The phase conjugate conversion device 200 uses the optical signal transmitted from the optical transmitter 100 as an input, and performs optical parametric amplification on the basis of the input optical signal. The optical parametric amplification generates idler light that is phase conjugate light of the optical signal. The phase conjugate conversion device 200 outputs an optical transmission signal including the optical signal, the idler light, and pilot light to be used to perform optical injection locking in the phase-sensitive amplification device 400 to the transmission line 300.

The transmission line 300 connects the phase conjugate conversion device 200 and the phase-sensitive amplification device 400 to each other. The transmission line 300 is, for example, an optical fiber or a free space. In the transmission line 300, the optical transmission signal output from the phase conjugate conversion device 200 is transmitted.

The phase-sensitive amplification device 400 uses the optical transmission signal transmitted via the transmission line 300 as an input, and performs phase-sensitive amplification on the basis of the input optical transmission signal.

The optical receiver 500 receives the optical transmission signal amplified by the phase-sensitive amplification device 400.

Figure 2:
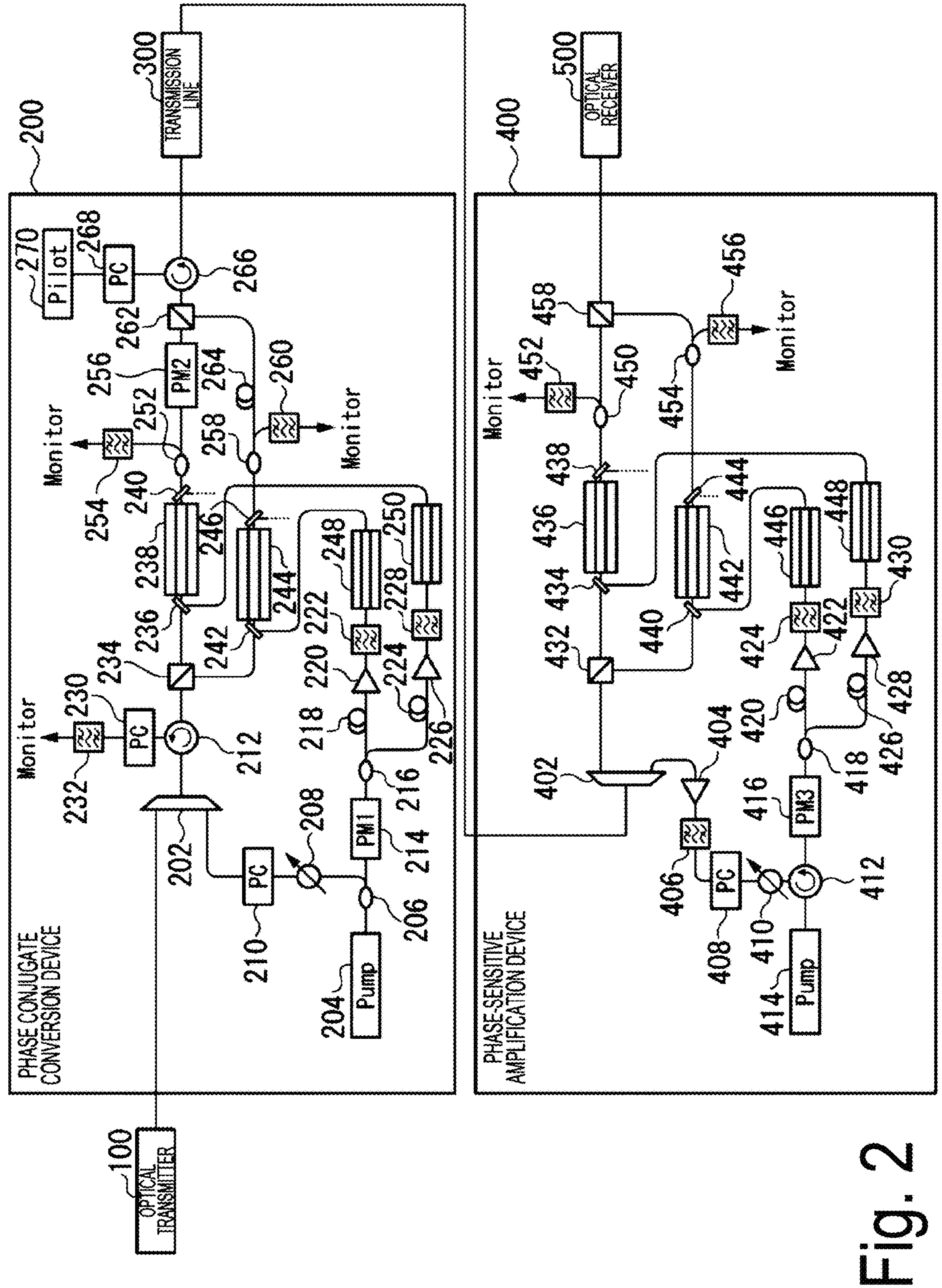
FIG. 2 A diagram illustrating specific configurations of a phase conjugate conversion device and a phase-sensitive amplification device in the first embodiment.

FIG. 2 is a diagram illustrating specific configurations of the phase conjugate conversion device 200 and the phase-sensitive amplification device 400 in the first embodiment. In the following description, configuration examples will be described of the phase conjugate conversion device 200 and the phase-sensitive amplification device 400 in a case where a second-order nonlinear medium is used as an optical parametric amplification medium.

(Configuration of Phase Conjugate Conversion Device 200)

The phase conjugate conversion device 200 includes a WDM coupler (multiplexer) 202, a pump light source 204, a multiplexer/splitter 206, 216, 252, 258, a variable optical attenuator (VOA) 208, a polarization controller (PC) 210, 230, 268, a circulator 212, 266, a first phase modulator 214, a transfer device (transferers) 218, 224, 264, an optical amplifier 220, 226, a band pass filters (BPF) 222, 228, 232, 254, 260, a polarization-beam splitter (PBS) 234, a pump light filter 236, 240, 242, 246, a second-order nonlinear optical medium 238, 244, 248, 250, a second phase modulator 256, a PBC (combiner) 262, and a pilot light source 270.

The WDM coupler 202 multiplexes or demultiplexes input optical signals. For example, first pilot light and the optical signal transmitted from the optical transmitter 100 are input to the WDM coupler 202. The WDM coupler 202 multiplexes the first pilot light and the optical signal that are input to generate a multiplexed signal. Here, the first pilot light is continuous light generated on the basis of pump light output from the pump light source 204 (written as "Pump" in FIG. 2).

More specifically, the first pilot light is generated in the following order. First, the pump light output from the pump light source 204 is split by the multiplexer/splitter 206. For a part of pump light split by the multiplexer/splitter 206, adjustment of optical power is performed by the VOA 208. Then, the pump light after the adjustment of the optical power is input to the polarization controller 210 (written as "PC" in FIG. 2), and pump light of a 45 degree linear polarization component is extracted by the polarization controller 210. The pump light of the 45 degree linear polarization component extracted by the polarization controller 210 is the first pilot light. The first pilot light is used as pilot light propagating in a forward direction. Here, the forward direction is a direction from a direction in which the optical transmitter 100 is connected toward a direction in which the transmission line 300 is connected.

The pump light source 204 outputs the pump light. For example, the pump light source 204 outputs continuous light having a degenerate wavelength around 1.5 m as the pump light.

The multiplexer/splitter 206 is provided between the pump light source 204 and the first phase modulator 214 (written as "PMT" in FIG. 2). The multiplexer/splitter 206 splits the pump light output from the pump light source 204 and outputs split pump light. The multiplexer/splitter 206 outputs the split pump light to the VOA 208 and the first phase modulator 214. The multiplexer/splitter 206 is an example of a first splitter.

The VOA 208 is provided between the multiplexer/splitter 206 and the polarization controller 210. The pump light split by the multiplexer/splitter 206 is input to the VOA 208. The VOA 208 adjusts power (optical power) of the input pump light. The VOA 208 is a variable optical attenuator.

The polarization controller 210 is provided between the WDM coupler 202 and the VOA 208. The pump light whose power (optical power) is adjusted by the VOA 208 is input to the polarization controller 210. The polarization controller 210 extracts pump light of a 45 degree linear polarization component in the input pump light whose power (optical power) is adjusted. That is, the polarization controller 210 extracts the first pilot light.

The circulator 212 includes a first port, a second port, and a third port. The first port included in the circulator 212 is connected to the WDM coupler 202. The second port included in the circulator 212 is connected to the PBS 234. The third port included in the circulator 212 is connected to the polarization controller 230. An optical signal input to the first port is output from the second port. An optical signal input to the second port is output from the third port. An optical signal input to the third port is output from the first port.

For example, the multiplexed signal generated by the WDM coupler 202 is input to the first port of the circulator 212. The multiplexed signal input to the first port of the circulator 212 is output from the second port.

The pump light split by the multiplexer/splitter 206 is input to the first phase modulator 214. The first phase modulator 214 performs phase modulation on the input pump light. For example, the first phase modulator 214 performs phase modulation on a dither signal into the input pump light.

The multiplexer/splitter 216 splits the pump light subjected to phase modulation by the first phase modulator 214 and outputs split pump light. The multiplexer/splitter 216 outputs the split pump light subjected to phase modulation to the transfer devices 218 and 224. The multiplexer/splitter 216 is an example of a second splitter.

The pump light subjected to phase modulation split by the multiplexer/splitter 216 is input to the transfer device 218, 224. The transfer device 218, 224 controls a phase of the input pump light subjected to phase modulation. As the transfer device, a phase modulator, a piezo driven fiber stretcher, or the like is used. The phase controlled in the transfer device 218, 224 is determined on the basis of the first pilot light.

The pump light whose phase is controlled by the transfer device 218, 224 is input to the optical amplifier 220, 226. The optical amplifier 220, 226 amplifies optical power of the input pump light whose phase is controlled.

The pump light whose optical power is amplified by the optical amplifier 220, 226 is input to the BPF 222, 228. The BPF 222, 228 transmits the input pump light whose optical power is amplified and removes an unnecessary noise component. Here, the unnecessary noise component is, for example, ASE noise generated in the optical amplifier 220, 226. As described above, the BPF 222, 228 is set to cause transmission in a frequency band of the pump light and attenuation in frequency bands other than that.

The pump light transmitted through the BPF 222 is input to the second-order nonlinear optical medium 248. The second-order nonlinear optical medium 248 generates second-harmonic pump light by converting the input pump light by using second-harmonic generation. The second-order nonlinear optical medium 248 outputs the generated second-harmonic pump light to the pump light filter 242. As described above, the second-order nonlinear optical medium 248 is a second-order nonlinear optical medium for second-harmonic generation. The second-order nonlinear optical medium 248 is an example of a harmonic generator.

The pump light transmitted through the BPF 228 is input to the second-order nonlinear optical medium 250. The second-order nonlinear optical medium 250 generates second-harmonic pump light by converting the input pump light by using second-harmonic generation (SHG). The second-order nonlinear optical medium 250 outputs the generated second-harmonic pump light to the pump light filter 236. As described above, the second-order nonlinear optical medium 250 is a second-order nonlinear optical medium for second-harmonic generation. The second-order nonlinear optical medium 250 is an example of the harmonic generation unit.

In a case where the optical parametric amplification medium is a second-order nonlinear medium as in the present embodiment, the pump light needs to be a second harmonic having a frequency twice the center wavelength (degenerate wavelength) of a phase matching characteristic of the optical parametric amplification medium. In order to generate idler light without excessive degradation of the noise figure, it is necessary to perform optical parametric amplification with a somewhat high amplification gain by strong pump light.

However, it is difficult to strongly generate a second harmonic (about 750 nm in wavelength) for near-infrared light having a wavelength of around 1.5 μm used in optical fiber communication generally. For that reason, a configuration is used in which continuous light is amplified by an optical amplifier (for example, the optical amplifier 220, 226) such as an EDFA by using the pump light source 204 that outputs the continuous light having a degenerate wavelength around 1.5 μm and then converted by using second harmonic generation to obtain strong second harmonic pump light.

As described above, in the configuration of the present embodiment, the pump light output from one pump light source 204 is divided by the multiplexer/splitter 216 to be the pump light for two polarization components, an optical path length from the division to the optical parametric amplification medium is sufficiently shorter than a coherence length of the pump light, and frequency noise between the two pieces of pump light can be ignored. It is necessary to perform modulation on the dither signal into the pump light by using an optical modulator such as a phase modulator for operation of a PLL in which each piece of pump light is subjected to relative phase synchronization with the first pilot light; however, this modulator may be arranged before dividing the pump light, or separate modulators may be used after the division. In the example illustrated in FIG. 2, phase modulation into the pump light is performed on the dither signal by the first phase modulator 214 before the pump light is divided.

The polarization controller 230 is provided between the circulator 212 and the BPF 232. Second pilot light output from the pilot light source 270 is input to the polarization controller 230. The second pilot light is used as pilot light propagating in a reverse direction. Here, the reverse direction is a direction opposite to the direction in which the first pilot light is propagated, for example, a direction from the direction in which the transmission line 300 is connected toward the direction in which the optical transmitter 100 is connected. The polarization controller 230 extracts light of a 45 degree linear polarization component from the input second pilot light.

The pilot light source 270 outputs the second pilot light. As the second pilot light, a light source different from the pump light is used. The second pilot light has at least a wavelength or optical power different from that of the first pilot light in order to avoid interference with a reflection component of the first pilot light. That is, the second pilot light has a wavelength or optical power different from that of the first pilot light, or both the wavelength and the optical power are different from those of the first pilot light.

By making the wavelengths of the first pilot light and the second pilot light different from each other, it is possible to effectively separate a desired pilot component and an unnecessary reflection component by the BPFs 232 and 254 arranged in respective monitor units for the pilot light. Influence of interference can also be reduced by making the power of the second pilot light sufficiently larger than that of the first pilot light.

The second pilot light, for which a light source different from the pump light is used, is incoherent, and thus is not subjected to degenerate phase-sensitive amplification even if the reflection component propagates in the forward direction in the amplification medium. For that reason, even if inflow occurs into the monitor unit for the first pilot light (for example, "Monitor" of the output destination of the BPF 254), an observed time variation depends largely on degenerate phase-sensitive amplification of the first pilot light, the second pilot light only gives a bias to a monitor value, and influence on control is small.

On the other hand, when reflected light of the first pilot light subjected to the degenerate phase-sensitive amplification flows into the monitor unit for the second pilot light (for example, "Monitor" of the output destination of the BPF 232), the time variation of the second pilot light and the time variation of the first pilot light are mixed, and control becomes difficult. Thus, by increasing input optical power so that the second pilot light enters the monitor unit sufficiently stronger than the reflected light of the first pilot light, the influence of interference between the two pilots can be reduced, and desired control can be stably performed.

The light of the 45 degree linear polarization component extracted by the polarization controller 230 is input to the BPF 232. The BPF 232 transmits the input light of the 45 degree linear polarization component and removes an unnecessary noise component.

The PBS 234 divides the multiplexed signal output from the second port of the circulator 212 into two polarization components orthogonal to each other. For example, the PBS 234 divides the multiplexed signal into an X polarization component (first polarization component) and a Y polarization component (second polarization component). The multiplexed signal includes the optical signal and the first pilot light. For that reason, the PBS 234 divides each of the optical signal and the first pilot light into the X polarization component and the Y polarization component. The PBS 234 outputs the X polarization component of the optical signal and the X polarization component of the first pilot light to the pump light filter 236, and outputs the Y polarization component of the optical signal and the Y polarization component of the first pilot light to the pump light filter 242. The PBS 234 is an example of a divider.

The pump light filter 236 is, for example, a dichroic filter. The X polarization component of the optical signal, the X polarization component of the first pilot light, and the second-harmonic pump light output from the second-order nonlinear optical medium 250 are input to the pump light filter 236. The pump light filter 236 multiplexes the X polarization component of the optical signal, the X polarization component of the first pilot light, and the second-harmonic pump light that are input.

The second-order nonlinear optical medium 238 performs optical parametric amplification by using the X polarization component of the optical signal, the X polarization component of the first pilot light, and the second-harmonic pump light that are multiplexed by the pump light filter 236. As a result, the X polarization component of the optical signal and the X polarization component of the first pilot light are amplified, and idler light is generated that is phase conjugate light of each of the X polarization component of the optical signal and the X polarization component of the first pilot light. The second-order nonlinear optical medium 238 is a second-order nonlinear optical medium for optical parametric amplification. The second-order nonlinear optical medium 238 is an example of a first optical parametric amplifier.

The pump light filter 240 is, for example, a dichroic filter. The amplified X polarization component of the optical signal, the amplified X polarization component of the first pilot light, the idler light, and the second-harmonic pump light that are output from the second-order nonlinear optical medium 238 are input to the pump light filter 240. The pump light filter 240 separates the second-harmonic pump light, in the amplified X polarization component of the optical signal, the amplified X polarization component of the first pilot light, the idler light, and the second-harmonic pump light that are input. Specifically, the pump light filter 240 reflects the second-harmonic pump light and transmits the amplified X polarization component of the optical signal, the amplified X polarization component of the first pilot light, and the idler light.

The pump light filter 242 is, for example, a dichroic filter. The Y polarization component of the optical signal, the Y polarization component of the first pilot light, and the second-harmonic pump light output from the second-order nonlinear optical medium 248 are input to the pump light filter 242. The pump light filter 242 multiplexes the Y polarization component of the optical signal, the Y polarization component of the first pilot light, and the second-harmonic pump light that are input.

The second-order nonlinear optical medium 244 performs optical parametric amplification by using the Y polarization component of the optical signal, the Y polarization component of the first pilot light, and the second-harmonic pump light that are multiplexed by the pump light filter 242. As a result, the Y polarization component of the optical signal and the Y polarization component of the first pilot light are amplified, and idler light is generated that is phase conjugate light of each of the Y polarization component of the optical signal and the Y polarization component of the first pilot light. The second-order nonlinear optical medium 244 is a second-order nonlinear optical medium for optical parametric amplification. The second-order nonlinear optical medium 244 is an example of a second optical parametric amplifier.

The pump light filter 246 is, for example, a dichroic filter. The amplified Y polarization component of the optical signal, the amplified Y polarization component of the first pilot light, the idler light, and the second-harmonic pump light that are output from the second-order nonlinear optical medium 244 are input to the pump light filter 246. The pump light filter 246 separates the second-harmonic pump light, in the amplified Y polarization component of the optical signal, the amplified Y polarization component of the first pilot light, the idler light, and the second-harmonic pump light that are input. Specifically, the pump light filter 246 reflects the second-harmonic pump light and transmits the amplified Y polarization component of the optical signal, the amplified Y polarization component of the first pilot light, and the idler light.

The multiplexer/splitter 252 splits and outputs the amplified X polarization component of the optical signal, the amplified X polarization component of the first pilot light, and the idler light that are transmitted through the pump light filter 240. The multiplexer/splitter 252 outputs the amplified X polarization component of the optical signal, the amplified X polarization component of the first pilot light, and the idler light that are split, to the BPF 254 and the second phase modulator 256 (written as "PM2" in FIG. 2).

The BPF 254 transmits the X polarization component of the first pilot light among the amplified X polarization component of the optical signal, the amplified X polarization component of the first pilot light, and the idler light that are split by the multiplexer/splitter 252. As described above, the BPF 254 is set to cause transmission in a frequency band of the X polarization component of the first pilot light and attenuation in frequency bands other than that. The X polarization component of the first pilot light transmitted by the BPF 254 is input to the monitor unit (first monitor).

The amplified X polarization component of the optical signal, the amplified X polarization component of the first pilot light, and the idler light that are split by the multiplexer/splitter 252 are input to the second phase modulator 256. The second phase modulator 256 performs phase modulation on the amplified X polarization component of the optical signal, the amplified X polarization component of the first pilot light, and the idler light that are input. For example, the second phase modulator 256 performs phase modulation on the dither signal into the amplified X polarization component of the optical signal, the amplified X polarization component of the first pilot light, and the idler light that are input.

The multiplexer/splitter 258 splits and outputs the amplified Y polarization component of the optical signal, the amplified Y polarization component of the first pilot light, and the idler light that are transmitted through the pump light filter 246. The multiplexer/splitter 258 outputs the amplified Y polarization component of the optical signal, the amplified Y polarization component of the first pilot light, and the idler light that are split, to the BPF 260 and the transfer device 264.

The BPF 260 transmits the Y polarization component of the first pilot light among the amplified Y polarization component of the optical signal, the Y polarization component of the amplified first pilot light, and the idler light that are split by the multiplexer/splitter 258. As described above, the BPF 260 is set to cause transmission in a frequency band of the Y polarization component of the first pilot light and attenuation in frequency bands other than that. The Y polarization component of the first pilot light transmitted by the BPF 260 is input to the monitor unit (second monitor unit).

The transfer device 264 controls phases of the amplified Y polarization component of the optical signal, the amplified Y polarization component of the first pilot light, and the idler light that are input. The phases controlled in the transfer device 264 are determined on the basis of the second pilot light.

The PBC 262 generates an optical transmission signal by multiplexing the X polarization component of the optical signal, the X polarization component of the first pilot light, and the idler light that are output from the second phase modulator 256 after phase modulation, and the Y polarization component of the optical signal, the Y polarization component of the first pilot light, and the idler light whose phases are controlled by the transfer device 264.

The circulator 266 includes a first port, a second port, and a third port. The first port included in the circulator 266 is connected to the PBC 262. The second port included in the circulator 266 is connected to the transmission line 300. The third port included in the circulator 266 is connected to the polarization controller 268. An optical signal input to the first port is output from the second port. An optical signal input to the second port is output from the third port. An optical signal input to the third port is output from the first port.

For example, the optical transmission signal generated by the PBC 262 is input to the first port included in the circulator 266, and the input optical transmission signal is output from the second port to the transmission line 300.

The second pilot light output from the pilot light source 270 is input to the polarization controller 268. The polarization controller 268 extracts light of a 45 degree linear polarization component from the input second pilot light.

(Configuration of Phase-Sensitive Amplification Device 400)

The phase-sensitive amplification device 400 includes a WDM coupler (demultiplexer) 402, an optical amplifier 404, 422, 428, a BPF 406, 424, 430, 452, 456, a polarization controller 408, a VOA 410, a circulator 412, a pump light source 414, a third phase modulator 416, a multiplexer/splitter 418, 450, 454, a transfer device (transferer) 420, 426, a PBS 432, a pump light filter 434, 438, 440, 444, a second-order nonlinear optical medium 436, 442, 446, 448, and a PBC (combiner) 458.

The optical transmission signal transmitted through the transmission line 300 is input to the WDM coupler 402. The WDM coupler 402 demultiplexes the input optical transmission signal. For example, the WDM coupler 402 outputs the first pilot light included in the optical transmission signal to the optical amplifier 404, and outputs the optical signal and the idler light to the PBS 432.

The optical amplifier 404 amplifies optical power of the first pilot light demultiplexed by the WDM coupler 402.

The first pilot light whose optical power is amplified by the optical amplifier 404 is input to the BPF 406. The BPF 406 transmits the first pilot light in which the input optical power is amplified, and removes an unnecessary noise component. As described above, the BPF 406 is set to cause transmission in a frequency band of the first pilot light and attenuation in frequency bands other than that.

The first pilot light transmitted through the BPF 406 is input to the polarization controller 408. The polarization controller 408 adjusts a polarization state of the input first pilot light to obtain TM polarized light.

The first pilot light adjusted to the TM polarized light by the polarization controller 408 is input to the VOA 410. The VOA 208 adjusts power (optical power) of the input first pilot light. The VOA 410 is a variable optical attenuator.

The circulator 412 includes a first port, a second port, and a third port. The first port included in the circulator 412 is connected to the pump light source 414. The second port included in the circulator 412 is connected to the third phase modulator 416 (written as "PM3" in FIG. 2). The third port included in the circulator 412 is connected to the polarization controller 408. An optical signal input to the first port is output from the second port. An optical signal input to the second port is output from the third port. An optical signal input to the third port is output from the first port.

For example, the first pilot light whose power (optical power) is adjusted by the VOA 410 is input to the third port of the circulator 412. The first pilot light input to the third port of the circulator 412 is output from the first port.

The first pilot light output from the first port of the circulator 412 is input to the pump light source 414. The pump light source 414 is subjected to optical injection locking by the input first pilot light. As a result, the pump light source 414 outputs pump light synchronized with the first pilot light.

The pump light output from the pump light source 414 is input to the third phase modulator 416 via the circulator 412. The third phase modulator 416 performs phase modulation on the input pump light. For example, the third phase modulator 416 performs phase modulation on the dither signal into the input pump light.

The multiplexer/splitter 418 splits the pump light subjected to phase modulation by the third phase modulator 416 and outputs split pump light. The multiplexer/splitter 418 outputs the split pump light subjected to phase modulation to the transfer devices 420 and 426. The multiplexer/splitter 418 is an example of a third splitter.

The pump light subjected to phase modulation split by the multiplexer/splitter 418 is input to the transfer device 420, 426. The transfer device 420, 426 controls the phase of the input pump light subjected to phase modulation. The phase controlled in the transfer device 420, 426 is determined on the basis of the optical signal or the idler light.

The pump light whose phase is controlled by the transfer device 420, 426 is input to the optical amplifier 422, 428. The optical amplifier 422, 428 amplifies optical power of the input pump light whose phase is controlled.

The pump light whose optical power is amplified by the optical amplifier 422, 428 is input to the BPF 424, 430. The BPF 424, 430 transmits the input pump light whose optical power is amplified and removes an unnecessary noise component. As described above, the BPF 424, 430 is set to cause transmission in a frequency band of the pump light and attenuation in frequency bands other than that.

The pump light transmitted through the BPF 424 is input to the second-order nonlinear optical medium 446. The second-order nonlinear optical medium 446 generates second-harmonic pump light by converting the input pump light by using second-harmonic generation. The second-order nonlinear optical medium 446 outputs the generated second-harmonic pump light to the pump light filter 440. As described above, the second-order nonlinear optical medium 446 is a second-order nonlinear optical medium for second-harmonic generation. The second-order nonlinear optical medium 446 is an example of the harmonic generator.

The pump light transmitted through the BPF 430 is input to the second-order nonlinear optical medium 448. The second-order nonlinear optical medium 448 generates second-harmonic pump light by converting the input pump light by using second-harmonic generation. The second-order nonlinear optical medium 448 outputs the generated second-harmonic pump light to the pump light filter 434. As described above, the second-order nonlinear optical medium 448 is a second-order nonlinear optical medium for second-harmonic generation. The second-order nonlinear optical medium 448 is an example of the harmonic generation unit.

The PBS 432 divides each of the optical signal and the idler light split by the WDM coupler 402 into two polarization components orthogonal to each other. For example, the PBS 432 divides each of the optical signal and the idler light into an X polarization component and a Y polarization component. The PBS 432 outputs the X polarization component of the optical signal and the X polarization component of the idler light to the pump light filter 434, and outputs the Y polarization component of the optical signal and the Y polarization component of the idler light to the pump light filter 440. The PBS 432 is an example of the divider.

The pump light filter 434 is, for example, a dichroic filter. The X polarization component of the optical signal, the X polarization component of the idler light, and the second-harmonic pump light output from the second-order nonlinear optical medium 448 are input to the pump light filter 434. The pump light filter 434 multiplexes the X polarization component of the optical signal, the X polarization component of the idler light, and the second-harmonic pump light that are input.

The X polarization component of the optical signal, the X polarization component of the idler light, and the second-harmonic pump light that are multiplexed by the pump light filter 434 are input to the second-order nonlinear optical medium 436. The second-order nonlinear optical medium 436 performs optical parametric amplification by using the X polarization component of the optical signal and the second-harmonic pump light that are input. As a result, the X polarization component of the optical signal is amplified, and idler light is generated that is phase conjugate light of the X polarization component of the optical signal. Further, the X polarization component of the idler light is also subjected to phase-sensitive amplification with the same amplification gain and low noise similarly to the optical signal. The second-order nonlinear optical medium 436 is a second-order nonlinear optical medium for optical parametric amplification. The second-order nonlinear optical medium 436 is an example of a third optical parametric amplifier.

The pump light filter 438 is, for example, a dichroic filter. The amplified X polarization component of the optical signal, the X polarization component of the idler light, and the second-harmonic pump light that are output from the second-order nonlinear optical medium 436 are input to the pump light filter 438. The pump light filter 438 separates the second-harmonic pump light, in the amplified X polarization component of the optical signal, the X polarization component of the idler light, and the second-harmonic pump light. Specifically, the pump light filter 438 reflects the second-harmonic pump light and transmits the amplified X polarization component of the optical signal and the X polarization component of the idler light.

The pump light filter 440 is, for example, a dichroic filter. The Y polarization component of the optical signal, the Y polarization component of the idler light, and the second-harmonic pump light output from the second-order nonlinear optical medium 446 are input to the pump light filter 440. The pump light filter 440 multiplexes the Y polarization component of the optical signal, the Y polarization component of the idler light, and the second-harmonic pump light that are input.

The Y polarization component of the optical signal, the Y polarization component of the idler light, and the second-harmonic pump light that are multiplexed by the pump light filter 440 are input to the second-order nonlinear optical medium 442. The second-order nonlinear optical medium 442 performs optical parametric amplification by using the Y polarization component of the optical signal and the second-harmonic pump light that are input. As a result, the Y polarization component of the optical signal is amplified, and idler light is generated that is phase conjugate light of the Y polarization component of the optical signal. Further, the Y polarization component of the idler light is also subjected to phase-sensitive amplification with the same amplification gain and low noise similarly to the optical signal. The second-order nonlinear optical medium 442 is a second-order nonlinear optical medium for optical parametric amplification. The second-order nonlinear optical medium 442 is an example of a fourth optical parametric amplifier.

The pump light filter 444 is, for example, a dichroic filter. The amplified Y polarization component of the optical signal, the Y polarization component of the idler light, and the second-harmonic pump light that are output from the second-order nonlinear optical medium 442 are input to the pump light filter 444. The pump light filter 444 separates the second-harmonic pump light, in the amplified Y polarization component of the optical signal, the Y polarization component of the idler light, and the second-harmonic pump light. Specifically, the pump light filter 444 reflects the second-harmonic pump light and transmits the amplified Y polarization component of the optical signal and the Y polarization component of the idler light.

The multiplexer/splitter 450 splits and outputs the X polarization component of the optical signal and the X polarization component of the idler light that are transmitted through the pump light filter 438. The multiplexer/splitter 450 outputs the X polarization component of the optical signal and the X polarization component of the idler light that are split, to the BPF 452 and the PBC 458.

The BPF 452 transmits the X polarization component of the optical signal or the X polarization component of the idler light, which is split by the multiplexer/splitter 450. As described above, the BPF 452 is set to cause transmission in a frequency band of the X polarization component of the optical signal or the X polarization component of the idler light and attenuation in frequency bands other than that. The X polarization component of the optical signal or the X polarization component of the idler light, which is transmitted by the BPF 452, is input to the monitor unit (third monitor).

The multiplexer/splitter 454 splits and outputs the Y polarization component of the optical signal and the Y polarization component of the idler light that are transmitted through the pump light filter 444. The multiplexer/splitter 454 outputs the Y polarization component of the optical signal and the Y polarization component of the idler light that are split, to the BPF 456 and the PBC 458.

The BPF 456 transmits the Y polarization component of the optical signal or the Y polarization component of the idler light, which is split by the multiplexer/splitter 454. As described above, the BPF 456 is set to cause transmission in a frequency band of the Y polarization component of the optical signal or the Y polarization component of the idler light and attenuation in frequency bands other than that. The Y polarization component of the optical signal or the Y polarization component of the idler light, which is transmitted by the BPF 456, is input to the monitor unit (fourth monitor).

The PBC 458 multiplexes the X polarization component of the optical signal and the X polarization component of the idler light that are split by the multiplexer/splitter 450, and the Y polarization component of the optical signal and the Y polarization component of the idler light that are split by the multiplexer/splitter 454.

Operation in First Embodiment

Next, a description will be given of an operation example of the phase conjugate conversion device 200 and the phase-sensitive amplification device 400 in the first embodiment.

The phase conjugate conversion device 200 multiplexes the optical signal transmitted from the optical transmitter 100 with the pump light output from the pump light source 204 by using the WDM coupler 202. Specifically, the pump light output from the pump light source 204 is split by the multiplexer/splitter 206, the optical power is adjusted by the VOA 208, and then 45 degree linear polarization pump light is extracted by the polarization controller 210. Then, the phase conjugate conversion device 200 multiplexes the 45 degree linear polarization pump light (first pilot light) extracted by the polarization controller 210 and the optical signal transmitted from the optical transmitter 100 by using the WDM coupler 202 to generate a multiplexed signal.

Next, the multiplexed signal generated by the WDM coupler 202 is divided into two polarization components orthogonal to each other by the PBS 234 via the circulator 212. For example, the multiplexed signal is divided into an X polarization component and a Y polarization component by the PBS 234. The polarization components of the multiplexed signal divided into two polarization components by the PBS 234 are subjected to optical parametric amplification by different nonlinear media (for example, the second-order nonlinear optical media 238 and 244).

A process until the optical parametric amplification is performed will be described more specifically. Each piece of the pump light split by the multiplexer/splitter 216 is subjected to phase control by the transfer device 218, 224 for controlling the phase. Thereafter, the pump light is amplified by the optical amplifier 220, 226, and then an unnecessary noise component generated in the optical amplifier 220, 226 is removed via the BPF 222, 228. The pump light transmitted through the BPF 222, 228 is converted into second-harmonic pump light by the second-order nonlinear optical medium 248, 250.

The second-harmonic pump light generated by the second-order nonlinear optical medium 250 and the X polarization component of the multiplexed signal divided by the PBS 234 are input to the pump light filter 236. The pump light filter 236 multiplexes the second-harmonic pump light generated by the second-order nonlinear optical medium 250 and the X polarization component of the multiplexed signal. An optical signal obtained by multiplexing the second-harmonic pump light and the X polarization component of the multiplexed signal is input to the second-order nonlinear optical medium 238.

Similarly, the second-harmonic pump light generated by the second-order nonlinear optical medium 248 and the Y polarization component of the multiplexed signal divided by the PBS 234 are input to the pump light filter 242. The pump light filter 242 multiplexes the second-harmonic pump light generated by the second-order nonlinear optical medium 248 and the Y polarization component of the multiplexed signal. An optical signal obtained by multiplexing the second-harmonic pump light and the Y polarization component of the multiplexed signal is input to the second-order nonlinear optical medium 244.

The optical signal input to each second-order nonlinear optical medium 238, 244 is amplified while generating idler light by optical parametric amplification. At this time, the first pilot light is subjected to degenerate phase-sensitive amplification by overlapping with the idler light generated at the same wavelength as that of the first pilot light. The phase of the idler light has a phase corresponding to a relative phase difference between the second-harmonic pump light and the first pilot light. For that reason, in the first pilot light subjected to degenerate phase-sensitive amplification to be interference light with the idler light, the optical power varies with time due to phase drift of the second-harmonic pump light and the first pilot light. When the phase of the second-harmonic pump light (the phase at the degenerate wavelength) matches the phase of the first pilot light, superposition with the idler light causes constructive interference, and amplification gain, that is, amplified optical power is maximized.

The optical signal amplified by the second-order nonlinear optical medium 238 and the generated idler light are separated from the pump light by the pump light filter 240, and then split by the multiplexer/splitter 252. Only the first pilot light out of the optical signal and the idler light split by the multiplexer/splitter 252 is extracted by the BPF 254. Thereafter, the transfer device 218, 224 is controlled by a PLL (first controller unit) by using an error signal generated by monitoring the optical power of the first pilot light by the monitor unit so that the amplified optical power of the first pilot light is always maximized, whereby the phases of the pump light and the first pilot light can be synchronized with each other. The PLL that controls the transfer device 218, 224 is connected to, for example, the monitor unit connected to the BPF 254, or the monitor unit to which the optical signal output from the multiplexer/splitter 258 is input.

One (for example, the X polarization component of the multiplexed signal) of two polarization components of the multiplexed signal divided by the PBS 234 is caused to pass through the second phase modulator 256 for modulating the dither signal, and the other (for example, the Y polarization component of the multiplexed signal) is caused to pass through the transfer device 264. Here, in order to avoid interference, the dither signal uses a frequency different from that used for pump light synchronization. Thereafter, the two polarization components are multiplexed by the PBC 262.

Similarly to the first pilot light, the second pilot light output from the pilot light source 270 is extracted by the polarization controller 268 as 45 degree linear polarization continuous light. Thereafter, the second pilot light extracted as the 45 degree linear polarization continuous light is input to the third port of the circulator 266 and output from the first port. The second pilot light is separated from the optical signal by the circulator 212. Thereafter, the polarization controller 230 extracts light of a 45 degree linear polarization component of the second pilot light. The BPF 232 transmits the second pilot light of the 45 degree linear polarization component extracted by the polarization controller 230. Then, by observing the optical power of the second pilot light transmitted through the BPF 232 by the monitor unit, an interference waveform between components passing through two paths can be obtained. Here, the two paths are paths each provided with the second-order nonlinear optical medium 238, 244 that performs optical parametric amplification.

An optical length (amount of phase rotation) between the two paths can be synchronized by controlling the transfer device 264 arranged in one path by a PLL (second controller) by using an error signal obtained from the interference waveform. Specifically, the optical lengths (amounts of phase rotation) of the respective paths of the nonlinear media are matched by using the second pilot light and controlling, by the PLL, the transfer device 264 arranged in the path of at least one of the nonlinear media so that the interference waveform of the components of the second pilot light that has passed through each nonlinear medium from behind is maximized. Note that the PLL that controls the transfer device 264 is connected to, for example, the monitor unit connected to the BPF 232. Through the above processing, it is possible to obtain a signal-idler pair having a carrier component independent of polarization. In a case where the amplification gain of the phase conjugate conversion device 200 is insufficient for transmission, additional optical amplification using an EDFA or the like may be performed at the subsequent stage of the phase conjugate conversion device 200.

After the above processing is performed by the phase conjugate conversion device 200, light including the optical signal, idler light, and first pilot light propagates through the transmission line 300 and is input to the phase-sensitive amplification device 400. In the phase-sensitive amplification device 400, the WDM coupler 402 separates the first pilot light from the input light. The separated first pilot light is output to the optical amplifier 404, and the optical signal and the idler light are output to the PBS 432. The first pilot light is amplified by the optical amplifier 404, and is input to the polarization controller 408 after an unnecessary noise component generated in the optical amplifier 404 is removed by the BPF 406. The first pilot light is adjusted to TM polarized light by the polarization controller 408, power is adjusted by the VOA 410, and then the first pilot light is injected into the pump light source 414 for phase-sensitive amplification.

The pump light source 414 is synchronized with the first pilot light by optical injection locking. At this time, if the first pilot light does not have sufficient optical power for the optical injection locking, amplification may be performed after separation by the WDM coupler 402 using an optical amplifier such as an EDFA. In a case where the amplification is performed, unnecessary ASE light generated in the optical amplifier needs to be cut by using the BPF 406. Note that, in a case where the first pilot light has sufficient optical power for the optical injection locking, the phase-sensitive amplification device 400 does not have to include the optical amplifier 404 and the BPF 406.

Similarly to the pump light (for example, the pump light output from the pump light source 204) of the phase conjugate conversion device 200, the synchronized pump light is converted into the second-harmonic pump light via the third phase modulator 416, the multiplexer/splitter 418, the transfer device 420, 426, the optical amplifier 422, 428, the BPF 424, the BPF 430, and the second-order nonlinear optical medium 446, 448.

The PBS 432 divides each of the optical signal and the idler light separated by the WDM coupler 402 into two polarization components. The PBS 432 outputs the X polarization component of the optical signal and the X polarization component of the idler light to the pump light filter 434, and outputs the Y polarization component of the optical signal and the Y polarization component of the idler light to the pump light filter 440.

The second-harmonic pump light generated by the second-order nonlinear optical medium 448 and the X polarization component of the optical signal and the X polarization component of the idler light divided by the PBS 432 are input to the pump light filter 434. The pump light filter 434 multiplexes the second-harmonic pump light generated by the second-order nonlinear optical medium 448, the X polarization component of the optical signal, and the X polarization component of the idler light. An optical signal obtained by multiplexing the second-harmonic pump light, the X polarization component of the optical signal, and the X polarization component of the idler light is input to the second-order nonlinear optical medium 436.

Similarly, the second-harmonic pump light generated by the second-order nonlinear optical medium 446 and the Y polarization component of the optical signal and the Y polarization component of the idler light divided by the PBS 432 are input to the pump light filter 440. The pump light filter 440 multiplexes the second-harmonic pump light generated by the second-order nonlinear optical medium 446, the Y polarization component of the optical signal, and the Y polarization component of the idler light. An optical signal obtained by multiplexing the second-harmonic pump light, the Y polarization component of the optical signal, and the Y polarization component of the idler light is input to the second-order nonlinear optical medium 442.

The optical signal input to each second-order nonlinear optical medium 436, 442 is amplified while generating idler light by optical parametric amplification. Since the pump light is synchronized with an average frequency of the signal-idler pair by synchronization with the first pilot light, the idler light that has been converted to a signal band by interaction between the pump light and the idler light is coherently combined with the optical signal, and the optical signal is subjected to phase-sensitive amplification. The same applies to the idler light.

At this time, since the optical signal and the pump light are multiplexed through different paths, even if the optical injection locking is performed, the optical signal and the pump light have a random relative phase difference due to phase drift. The amplification gain of the optical signal and the idler light fluctuates randomly due to fluctuation of the random relative phase difference. A part of the optical power of the optical signal or the idler light is monitored, and the transfer devices 420 and 426 are controlled by a PLL (third controller) so that the fluctuation of the amplification gain is maximized, whereby the phase-sensitive amplification with the maximum amplification gain of the optical signal and the idler light is performed, and the low noise amplification is implemented. The PLL that controls the transfer device 420, 426 is connected to, for example, the monitor unit connected to the BPF 452 or the monitor unit connected to the BPF 456.

At this time, the signal-idler pair has a constant carrier component regardless of a polarization state by processing in an optical phase conjugator, and even if the signal-idler pair is divided by the PBS 432 at any polarization plane, it is possible to implement phase-sensitive amplification with the maximum amplification gain without signal distortion for all input electric field components.

The example of the present embodiment has been described using a configuration in which the second harmonic generation and the optical parametric amplification are performed by different second-order nonlinear optical media. On the other hand, in optical parametric amplification using a third-order nonlinear medium, pump light is arranged at a degenerate frequency and is input together with an optical signal. The same applies to a configuration in which second harmonic generation for pump light conversion and optical parametric amplification are collectively performed in one second-order nonlinear medium. In such a configuration for optical parametric amplification, it is necessary to use an interferometer or the like in order to separate pump light and pilot light arranged at the same frequency from each other after amplification (see Reference Literature 1).

(Reference Literature 1: W. Imajuku and A. Takada, "Gain Characteristics of Coherent Optical Amplifiers Using a Mach-Zehnder Interferometer with Kerr Media", IEEE JOURNAL OF QUANTUM ELECTRONICS, VOL. 35, NO. 11 Nov. 1999, 1657-1665.)

According to the optical transmission system 10 configured as described above, in the phase conjugate conversion device 200 that generates the idler light, the phases of the pump light and the inside of the phase conjugate conversion device 200 are stably synchronized with each other by using the first pilot light propagating in the forward direction and the second pilot light propagating in the reverse direction, whereby it is possible to implement stable polarization independence of the optical transmission system using the phase-sensitive amplification device 400.

Second Embodiment

Figure 3:
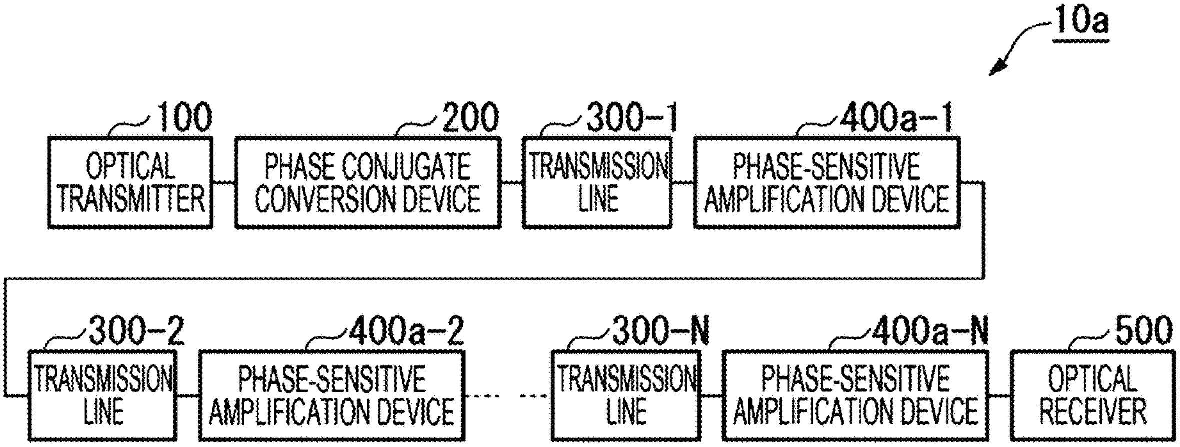
FIG. 3 A diagram illustrating a configuration example of an optical transmission system in a second embodiment.

FIG. 3 is a diagram illustrating a configuration example of an optical transmission system 10*a* in a second embodiment. The optical transmission system 10*a* includes an optical transmitter 100, a phase conjugate conversion device 200, a plurality of transmission lines 300-1 to 300-N (N is an integer greater than or equal to 2), a plurality of phase-sensitive amplification devices 400*a*-1 to 400*a*-N, and an optical receiver 500. In the optical transmission system 10*a*, a case is assumed where the phase-sensitive amplification devices 400*a* are used as amplification repeaters. The optical transmission system 10*a* in the second embodiment is a system that transmits a signal while amplifying the signal for each certain section by using an optical amplifier before optical power of the signal is completely decreased to be unreceivable due to a loss of the transmission line 300.

Figure 4:
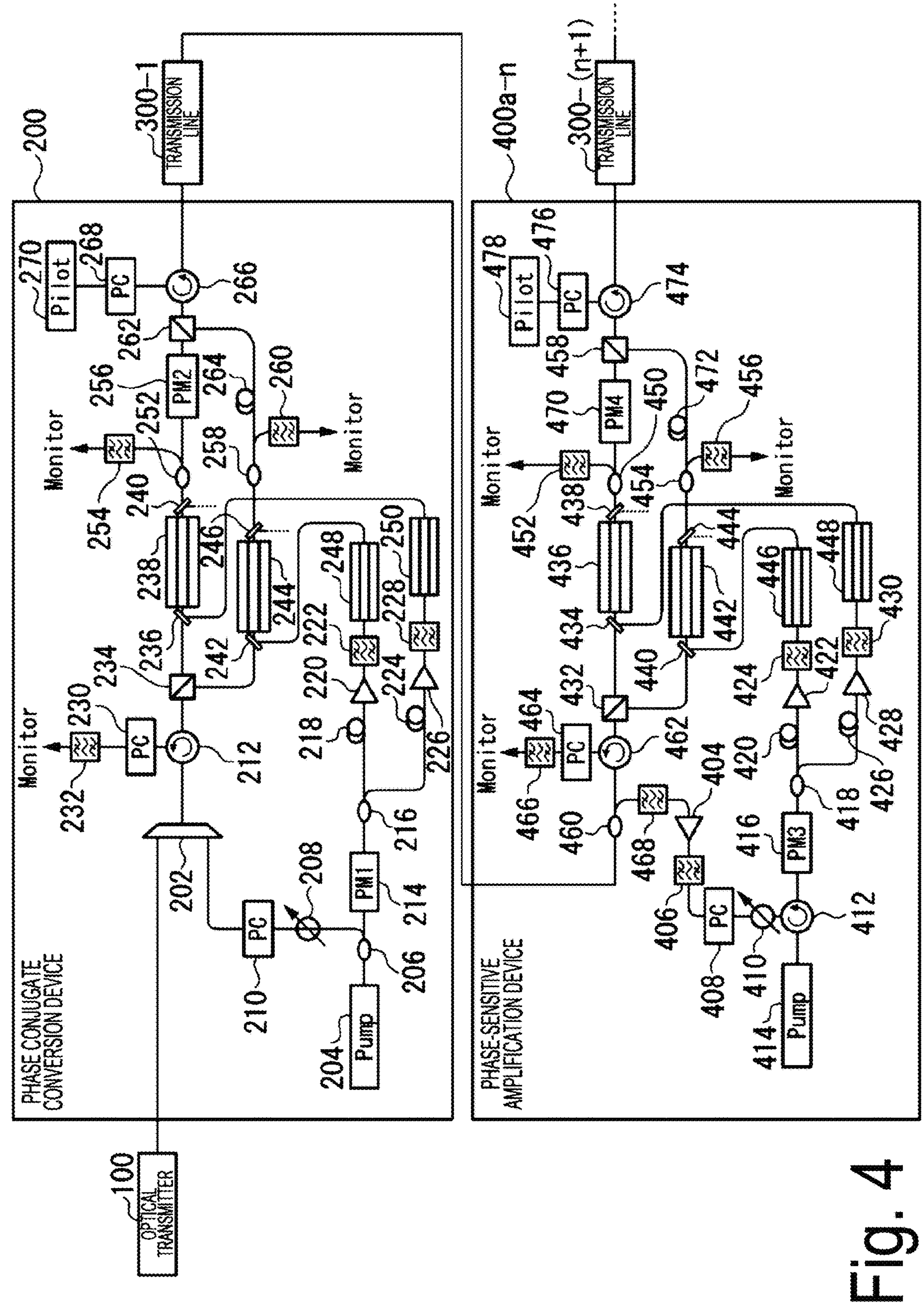
FIG. 4 A diagram illustrating specific configurations of a phase conjugate conversion device and a phase-sensitive amplification device in the second embodiment.

FIG. 4 is a diagram illustrating specific configurations of the phase conjugate conversion device 200 and the phase-sensitive amplification device 400*a-n* (1≤n≤N) in the second embodiment. FIG. 4 illustrates configuration examples of the phase conjugate conversion device 200 and the phase-sensitive amplification device 400*a-n* in a case where a second-order nonlinear medium is used as an optical parametric amplification medium. In the second embodiment, since the configuration of the phase conjugate conversion device 200 is similar to that of the first embodiment, the description thereof is omitted.

In a case where the phase-sensitive amplification device 400*a-n* is used as an amplification repeater, it is necessary to compensate for a relative phase difference between orthogonal polarization components due to phase drift of the phase-sensitive amplification device 400*a-n*, and perform transmission to the phase-sensitive amplification device 400*a-n* at the next stage while maintaining polarization independency of a carrier component of a signal-idler pair. For that reason, it is necessary to perform processing similar to that in the phase conjugate conversion device 200 also in the phase-sensitive amplification device 400*a-n*. Here, a specific configuration of the phase-sensitive amplification device 400*a*

(Configuration of Phase-Sensitive Amplification Device 400*a-n*)

The phase-sensitive amplification device 400*a-n* includes an optical amplifier 404, 422, 428, a BPF 406, 424, 430, 452, 456, 466, 468, a polarization controller 408, 464, 476, a VOA 410, a circulator 412, 462, 474, a pump light source 414, a third phase modulator 416, a multiplexer/splitter 418, 450, 454, 460, a transfer device 420, 426, 472, a PBS 432, a pump light filter 434, 438, 440, 444, a second-order nonlinear optical medium 436, 442, 446, 448, a PBC 458, a fourth phase modulator 470, and a pilot light source 478. Hereinafter, a configuration different from the phase-sensitive amplification device 400 will be described.

An optical transmission signal transmitted through the transmission line 300 is input to the multiplexer/splitter (fourth splitter) 460. For example, first pilot light, an optical signal, and idler light are input to the multiplexer/splitter 460. The multiplexer/splitter 460 splits and outputs the first pilot light, the optical signal, and the idler light that are input. The multiplexer/splitter 460 outputs the first pilot light, the optical signal, and the idler light that are split, to the circulator 462 and the BPF (filter) 468.

The circulator 462 includes a first port, a second port, and a third port. The first port included in the circulator 462 is connected to the multiplexer/splitter 460. The second port included in the circulator 462 is connected to the PBS 432. The third port included in the circulator 462 is connected to the polarization controller 464. An optical signal input to the first port is output from the second port. An optical signal input to the second port is output from the third port. An optical signal input to the third port is output from the first port.

The polarization controller 464 is provided between the circulator 462 and the BPF 466. Third pilot light is input to the polarization controller 464. The polarization controller 464 extracts light of a 45 degree linear polarization component from the input third pilot light.

Light extracted by the polarization controller 464 is input to the BPF 466. The BPF 466 transmits the input light and removes an unnecessary noise component.

The first pilot light, the optical signal, and the idler light split by the multiplexer/splitter 460 are input to the BPF 468. The BPF 468 transmits the first pilot light among the first pilot light, the optical signal, and the idler light that are input. As described above, the BPF 468 is set to cause transmission in the frequency band of the first pilot light and attenuation in frequency bands other than that.

The fourth phase modulator 470 (written as "PM4" in FIG. 4) is provided between the multiplexer/splitter 450 and the PBC 458. The fourth phase modulator 470 performs phase modulation on the X polarization component of the first pilot light and the X polarization component of the idler light that are split by the multiplexer/splitter 450. For example, the first phase modulator 214 performs phase modulation on the dither signal into the X polarization component of the first pilot light and the X polarization component of the idler light that are input.

The transfer device 472 is provided between the multiplexer/splitter 454 and the PBC 458. The transfer device 472 controls phases of the Y polarization component of the first pilot light and the Y polarization component of the idler light that are input.

The circulator 474 includes a first port, a second port, and a third port. The first port included in the circulator 474 is connected to the PBC 458. The second port included in the circulator 474 is connected to the transmission line 300-(*n*+1). The third port included in the circulator 474 is connected to the polarization controller 476. An optical signal input to the first port is output from the second port. An optical signal input to the second port is output from the third port. An optical signal input to the third port is output from the first port.

The third pilot light output from the pilot light source 478 is input to the polarization controller 476. The polarization controller 476 extracts light of a 45 degree linear polarization component from the input third pilot light.

The pilot light source 478 outputs the third pilot light. The third pilot light has at least a wavelength or optical power different from that of the first pilot light in order to avoid interference with a reflection component of the first pilot light. That is, the third pilot light has a wavelength or optical power different from that of the first pilot light, or both the wavelength and the optical power are different from those of the first pilot light.

The third pilot light output from the pilot light source 478 is extracted as 45 degree linear polarization continuous light by the polarization controller 476. Thereafter, the third pilot light extracted as the 45 degree linear polarization continuous light is input to the third port of the circulator 474 and output from the first port. The third pilot light is separated from the optical signal by the circulator 462. Thereafter, the polarization controller 464 extracts light of a 45 degree linear polarization component of the third pilot light. The BPF 466 transmits the third pilot light of the 45 degree linear polarization component extracted by the polarization controller 464. Then, by observing the optical power of the third pilot light transmitted through the BPF 466 by the monitor unit, an interference waveform between components passing through two paths can be obtained. Here, the two paths are paths each provided with the second-order nonlinear optical medium 436, 442 that performs optical parametric amplification.

An optical length (amount of phase rotation) between the two paths can be synchronized by controlling the transfer device 472 arranged in one path by a PLL (fourth controller) by using an error signal obtained from the interference waveform. Specifically, the optical lengths (amounts of phase rotation) of the respective paths of the nonlinear media are matched by using the third pilot light and controlling, by the PLL, the transfer device 472 arranged in the path of at least one of the nonlinear media so that the interference waveform of the components of the third pilot light that has passed through each nonlinear medium from behind is maximized. Note that the PLL that controls the transfer device 472 is connected to, for example, the monitor unit connected to the BPF 466. Through the above processing, it is possible to obtain a signal-idler pair having a carrier component independent of polarization.

Operation in Second Embodiment

Next, a description will be given of an operation example of the phase conjugate conversion device 200 and the phase-sensitive amplification device 400*a* in the second embodiment. In the phase-sensitive amplification device 400*a*, the optical transmission signal is split by the multiplexer/splitter 460 arranged in front of the circulator 462, only a component of the first pilot light is extracted by the BPF 468, and injected into the pump light source 414 as in the first embodiment, whereby optical injection locking is performed. A component going to the optical parametric amplification medium (for example, the second-order nonlinear optical medium 436, 442) passes through a configuration similar to the phase conjugate conversion device 200. At this time, the BPFs 452 and 456 that perform relative phase synchronization of the pump light by monitoring the gain of the phase-sensitive amplification may extract any component of the optical signal, the idler light, and the pilot light.

Similarly to the phase conjugate conversion device 200, one of the amplified polarization components passes through the transfer device 472, and the other passes through the fourth phase modulator 470 for modulating the dither signal. Similarly to the phase conjugate conversion device 200, pilot light having a wavelength different from that of the first pilot light is inserted from the rear by using the circulator 474 and separated by using the circulator 462 on the input side. After the separated pilot light is extracted by the BPF 12, a 45 degree polarization plane is extracted to obtain an interference waveform of components passing through respective paths of a PSA unit. Compensation for phase drift between two paths of the PSA unit is performed by controlling the transfer device 472 by the PLL so that the intensity of the interference waveform is maximized.

According to the optical transmission system 10*a* configured as described above, the carrier component independent of polarization is maintained even at the output of the PSA unit, and polarization independent operation can be implemented even at the next-stage PSA unit.

Modification of Second Embodiment

Figure 5:
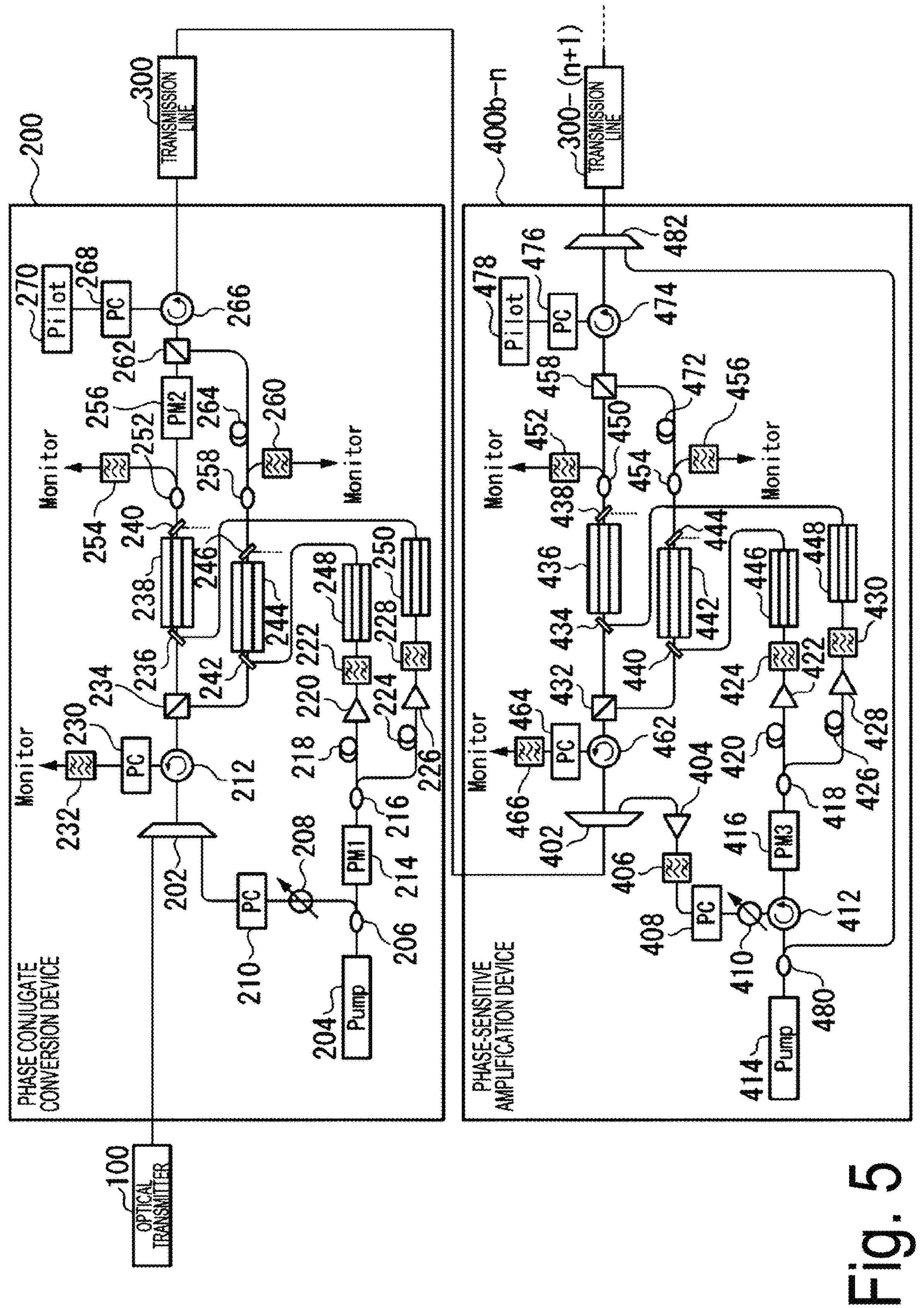
FIG. 5 A diagram illustrating specific configurations of a phase conjugate conversion device and a phase-sensitive amplification device in a modification of the second embodiment.

The phase-sensitive amplification device 400*a* in the second embodiment may be modified as illustrated in FIG. 5. FIG. 5 is a diagram illustrating specific configurations of a phase conjugate conversion device 200 and a phase-sensitive amplification device 400*b-n* in a modification of the second embodiment. FIG. 5 illustrates configuration examples of the phase conjugate conversion device 200 and the phase-sensitive amplification device 400*b-n* in a case where a second-order nonlinear medium is used as an optical parametric amplification medium. In the modification of the second embodiment, since the configuration of the phase conjugate conversion device 200 is similar to that of the second embodiment, the description thereof is omitted.

(Configuration of Phase-Sensitive Amplification Device 400*b-n*)

The phase-sensitive amplification device 400*b-n* includes a WDM coupler 402, 482, an optical amplifier 404, 422, 428, a BPF 406, 424, 430, 452, 456, 466, a polarization controller 408, 464, 476, a VOA 410, a circulator 412, 462, 474, a pump light source 414, a third phase modulator 416, a multiplexer/splitter 418, 450, 454, 480, a transfer device 420, 426, 472, a PBS 432, a pump light filter 434, 438, 440, 444, a second-order nonlinear optical medium 436, 442, 446, 448, a PBC 458, and a pilot light source 478. Hereinafter, a configuration different from the phase-sensitive amplification device 400*a* will be described.

In the phase-sensitive amplification device 400*b-n*, similarly to the phase-sensitive amplification device 400 in the first embodiment, the first pilot light is demultiplexed by the WDM coupler 402 in the optical signal transmitted via the transmission line 300. Then, in the phase-sensitive amplification device 400*b-n*, optical injection locking is performed using the first pilot light, similarly to the other embodiments.

In FIG. 5, the first port included in the circulator 412 is connected to the multiplexer/splitter 480. In FIG. 5, the second port included in the circulator 474 is connected to the WDM coupler 482.

The pump light output from the pump light source 414 is input to the multiplexer/splitter (fifth splitter) 480. The multiplexer/splitter 480 splits the input pump light and outputs split pump light. The multiplexer/splitter 480 outputs the split pump light to the circulator 412 and the WDM coupler (second combiner) 482.

The WDM coupler 482 multiplexes a signal (a signal obtained by multiplexing the X polarization component of the first pilot light, the X polarization component of the idler light, the Y polarization component of the first pilot light, and the Y polarization component of the idler light) output from the second port included in the circulator 474, and the pump light split by the multiplexer/splitter 480. The WDM coupler 482 outputs the multiplexed signal to the transmission line 300.

According to the phase-sensitive amplification device 400*b* configured as described above, the pilot light can be injected into the pump light source at a high signal-to-noise ratio, and the frequency of the pump light source can be more stably synchronized. Since the first pilot light does not pass through the path of the OPA medium, it is necessary to insert pump light obtained by splitting pilot light for the next-stage PSA unit by using the WDM coupler 3 after phase-sensitive amplification.

Although the embodiments of the present invention have been described in detail with reference to the drawings, the specific configuration is not limited to the embodiments, and includes design and the like within the scope not departing from the gist of the present invention.

INDUSTRIAL APPLICABILITY

The present invention can be applied to an optical transmission system using phase-sensitive amplification.

REFERENCE SIGNS LIST

10, 10*a* Optical transmission system
100 Optical transmitter
200 Phase conjugate conversion device
300 Transmission line
400, 400*a*, 400*b* Phase-sensitive amplification device
500 Optical receiver
202, 402, 482 WDM coupler
204, 414 Pump light source
206, 216, 252, 258, 418, 450, 454, 460, 480 Multiplexer/splitter
208, 410 VOA
210, 230, 268, 408, 464, 476 Polarization controller
212, 266, 412, 462, 474 Circulator
214 First phase modulator
218, 224, 264, 420, 426, 472 Transfer device
220, 226, 404, 422, 428 Optical amplifier
222, 228, 232, 254, 260, 406, 424, 430, 452, 456, 466, 468 BPF
234, 432 PBS
236, 240, 242, 246, 434, 438, 440, 444 Pump light filter
238, 244, 248, 250, 436, 442, 446, 448 Second-order nonlinear optical medium
256 Second phase modulator
262, 458 PBC
270, 478 Pilot light source
416 Third phase modulator
470 Fourth phase modulator

The invention claimed is:

1. An optical transmission system comprising:

a phase conjugate conversion device including: a first splitter configured to split pump light; a multiplexer configured to multiplex first pilot light that is generated on a basis of the pump light split by the first splitter and propagates in a first direction, and an optical signal transmitted from an optical transmitter; a second splitter configured to split the pump light split by the first splitter; a plurality of transferers configured to respectively perform phase control on a plurality of pieces of the pump light split; a plurality of harmonic generators configured to convert the plurality of pieces of the pump light subjected to phase control by the respective plurality of transferers into harmonics; a divider configured to divide the first pilot light and the optical signal that are multiplexed by the multiplexer into two polarization components orthogonal to each other; a first optical parametric amplifier configured to perform optical parametric amplification on a basis of a first polarization component of the first pilot light and a first polarization component of the optical signal that are divided by the divider, and the harmonics converted by the plurality of harmonic generators; a second optical parametric amplifier configured to perform optical parametric amplification on a basis of a second polarization component of the first pilot light and a second polarization component of the optical signal that are divided by the divider, and the harmonics converted by the plurality of harmonic generators; a combiner configured to generate an optical transmission signal by multiplexing the first polarization component of the first pilot light and the first polarization component of the optical signal that are amplified by the first optical parametric amplifier, and the second polarization component of the first pilot light and the second polarization component of the optical signal that are amplified by the second optical parametric amplifier; a first monitor configured to monitor power of the first polarization component of the first pilot light amplified by the first optical parametric amplifier; a second monitor configured to monitor power of the second polarization component of the first pilot light amplified by the second optical parametric amplifier; a first controller configured to synchronize phases of the harmonics and the first pilot light by controlling phases of the pump light input to the plurality of harmonic generators to cause each of optical power of the first pilot light amplified by the first optical parametric amplifier and optical power of the first pilot light amplified by the second optical parametric amplifier to be maximum on a basis of monitoring results by the first monitor-unit and the second monitor; a second pilot light source configured to output second pilot light in which at least a wavelength or optical power is different from that of the first pilot light; a circulator configured to propagate the second pilot light output from the second pilot light source in a second direction that is an opposite direction to the first direction, and externally outputs the optical transmission signal output from the combiner; and a second controller configured to match optical lengths of paths of the first optical parametric amplifier and the second optical parametric amplifier by controlling a transfer device arranged in at least one of the paths to cause an interference waveform of components of the second pilot light caused to pass in the second direction to be maximum;

an optical transmitter configured to transmit the optical transmission signal output from the phase conjugate conversion device; and a phase-sensitive amplification device configured to perform phase-sensitive amplification of the optical signal and idler light included in the optical transmission signal by optical parametric amplification using the pump light controlled by using the first pilot light included in the optical transmission signal.

2. The optical transmission system according to claim 1, wherein the phase-sensitive amplification device includes:

a pump light source configured to output pump light for optical parametric amplification by performing optical injection locking to the pump light source by using the first pilot light included in the optical transmission signal;

a third splitter configured to split the pump light output from the pump light source;

a plurality of transferers configured to respectively perform phase control on a plurality of pieces of the pump light split;

a plurality of harmonic generators configured to convert the plurality of pieces of the pump light subjected to phase control by the respective plurality of transferers into harmonics;

a divider configured to divide the optical signal included in the optical transmission signal into two polarization components orthogonal to each other;

a third optical parametric amplifier configured to perform optical parametric amplification on a basis of the first polarization component of the optical signal divided by the divider and the harmonics converted by the plurality of harmonic generators;

a fourth optical parametric amplifier configured to perform optical parametric amplification on a basis of the second polarization component of the optical signal divided by the divider and the harmonics converted by the plurality of harmonic generators;

a combiner configured to multiplex the first polarization component of the optical signal amplified by the third optical parametric amplifier and the second polarization component of the optical signal amplified by the fourth optical parametric amplifier;

a third monitor configured to monitor power of the first polarization component of the optical signal amplified by the third optical parametric amplifier;

a fourth monitor configured to monitor power of the second polarization component of the optical signal amplified by the fourth optical parametric amplifier;

a third controller configured to synchronize phases of the harmonics and the optical signal by controlling phases of the pump light input to the plurality of harmonic generators to cause each of optical power of the optical signal amplified by the third optical parametric amplifier and optical power of the optical signal amplified by the fourth optical parametric amplifier to be maximum on a basis of monitoring results by the third monitor and the fourth monitor;

a third pilot light source configured to output third pilot light in which at least a wavelength or optical power is different from that of the first pilot light;

a circulator configured to propagate the third pilot light output from the third pilot light source in a second direction that is an opposite direction to the first direction; and a fourth controller configured to match optical lengths of paths of the third optical parametric amplifier and the fourth optical parametric amplifier by controlling a transfer device arranged in at least one of the paths to cause an interference waveform of components of the third pilot light caused to pass in the second direction through each of the third optical parametric amplifier and the fourth optical parametric amplifier to be maximum.

3. The optical transmission system according to claim 2, wherein the phase-sensitive amplification device includes:

a fourth splitter configured to split the optical transmission signal output from the phase conjugate conversion device; and a filter configured to extract the first pilot light from the optical transmission signal split by the fourth splitter, and the pump light source outputs pump light for optical parametric amplification by performing optical injection locking of the first pilot light extracted by the filter to the pump light source.

4. The optical transmission system according to claim 2, wherein the phase-sensitive amplification device further includes:

a demultiplexer unit configured to demultiplex the first pilot light from the optical transmission signal output from the phase conjugate conversion device;

a fifth splitter configured to split the pump light output from the pump light source at a stage before the third splitter; and a second combiner configured to multiplex the first polarization component of the optical signal and the second polarization component of the optical signal that are multiplexed by the combiner, and the pump light split by the fifth splitter.

5. A phase conjugate conversion device comprising:

a first splitter configured to split pump light;

a multiplexer configured to multiplex first pilot light that is generated on a basis of the pump light split by the first splitter and propagates in a first direction, and an optical signal transmitted from an optical transmitter;

a second splitter configured to split the pump light split by the first splitter;

a plurality of transferers that respectively performs phase control on a plurality of pieces of the pump light split;

a plurality of harmonic generators configured to convert the plurality of pieces of the pump light subjected to phase control by the respective plurality of transferers into harmonics;

a divider configured to divide the first pilot light and the optical signal that are multiplexed by the multiplexer into two polarization components orthogonal to each other;

a first optical parametric amplifier configured to perform optical parametric amplification on a basis of a first polarization component of the first pilot light and a first polarization component of the optical signal that are divided by the divider, and the harmonics converted by the plurality of harmonic generators;

a second optical parametric amplifier configured to perform optical parametric amplification on a basis of a second polarization component of the first pilot light and a second polarization component of the optical signal that are divided by the divider, and the harmonics converted by the plurality of harmonic generators;

a combiner configured to generate an optical transmission signal by multiplexing the first polarization component of the first pilot light and the first polarization component of the optical signal that are amplified by the first optical parametric amplifier, and the second polarization component of the first pilot light and the second polarization component of the optical signal that are amplified by the second optical parametric amplifier;

a first monitor configured to monitor power of the first polarization component of the first pilot light amplified by the first optical parametric amplifier;

a second monitor configured to monitor power of the second polarization component of the first pilot light amplified by the second optical parametric amplifier;

a first controller configured to synchronize phases of the harmonics and the first pilot light by controlling phases of the pump light input to the plurality of harmonic generators to cause each of optical power of the first pilot light amplified by the first optical parametric amplifier and optical power of the first pilot light amplified by the second optical parametric amplifier to be maximum on a basis of monitoring results by the first monitor and the second monitor;

a second pilot light source configured to output second pilot light in which at least a wavelength or optical power is different from that of the first pilot light;

a circulator configured to propagate the second pilot light output from the second pilot light source in a second direction that is an opposite direction to the first direction, and externally outputs the optical transmission signal output from the combiner; and a second controller configured to match optical lengths of paths of the first optical parametric amplifier and the second optical parametric amplifier by controlling a transfer device arranged in at least one of the paths to cause an interference waveform of components of the second pilot light caused to pass in the second direction through each of the first optical parametric amplifier and the second optical parametric amplifier to be maximum.

6. A phase-sensitive amplification device comprising:

a pump light source configured to output pump light for optical parametric amplification by performing optical injection locking to the pump light source by using first pilot light included in an optical transmission signal transmitted from a phase conjugate conversion device configured to perform optical parametric amplification;

a third splitter configured to split the pump light output from the pump light source;

a plurality of transferers configured to respectively perform phase control on a plurality of pieces of the pump light split;

a plurality of harmonic generators configured to convert the plurality of pieces of the pump light subjected to phase control by the respective plurality of transferers into harmonics;

a divider configured to divide an optical signal included in the optical transmission signal into two polarization components orthogonal to each other;

a third optical parametric amplifier configured to perform optical parametric amplification on a basis of a first polarization component of the optical signal divided by the divider and the harmonics converted by the plurality of harmonic generators;

a fourth optical parametric amplifier configured to perform optical parametric amplification on a basis of a second polarization component of the optical signal divided by the divider and the harmonics converted by the plurality of harmonic generators;

a combiner configured to multiplex the first polarization component of the optical signal amplified by the third optical parametric amplifier and the second polarization component of the optical signal amplified by the fourth optical parametric amplifier;

a third monitor configured to monitor power of the first polarization component of the optical signal amplified by the third optical parametric amplifier;

a fourth monitor configured to monitor power of the second polarization component of the optical signal amplified by the fourth optical parametric amplifier;

a third controller configured to synchronize phases of the harmonics and the optical signal by controlling phases of the pump light input to the plurality of harmonic generators to cause each of optical power of the optical signal amplified by the third optical parametric amplifier and optical power of the optical signal amplified by the fourth optical parametric amplifier to be maximum on a basis of monitoring results by the third monitor and the fourth monitor;

a third pilot light source configured to output third pilot light in which at least a wavelength or optical power is different from that of the first pilot light;

a circulator configured to propagate the third pilot light output from the third pilot light source in a second direction that is an opposite direction to the first direction; and a fourth controller configured to match optical lengths of paths of the third optical parametric amplifier and the fourth optical parametric amplifier by controlling a transfer device arranged in at least one of the paths to cause an interference waveform of components of the third pilot light caused to pass in the second direction through each of the third optical parametric amplifier and the fourth optical parametric amplifier to be maximum.

* * * * *